(12) United States Patent
Kanemitsu

(10) Patent No.: US 11,528,272 B2
(45) Date of Patent: Dec. 13, 2022

(54) INFORMATION PROCESSING SYSTEM, INFORMATION PROCESSING DEVICE, AND INFORMATION PROCESSING METHOD

(71) Applicant: KYOCERA Document Solutions Inc., Osaka (JP)

(72) Inventor: Shigenaka Kanemitsu, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 196 days.

(21) Appl. No.: 16/941,637

(22) Filed: Jul. 29, 2020

(65) Prior Publication Data
US 2021/0037012 A1 Feb. 4, 2021

(30) Foreign Application Priority Data
Jul. 30, 2019 (JP) ............... JP2019-139862

(51) Int. Cl.
*H04L 9/40* (2022.01)
*G06F 21/31* (2013.01)
*H04W 12/06* (2021.01)

(52) U.S. Cl.
CPC .......... *H04L 63/0884* (2013.01); *G06F 21/31* (2013.01); *H04L 63/0281* (2013.01); *H04W 12/06* (2013.01)

(58) Field of Classification Search
CPC ....... H04W 12/08; H04W 12/06; G06F 21/31; H04L 63/107; H04L 63/0884; H04L 63/0281
See application file for complete search history.

(56) References Cited

U.S. PATENT DOCUMENTS 8,625,796 B1* 1/2014 Ben Ayed ............. H04W 12/64
380/258
8,689,294 B1* 4/2014 Thakur ................... H04L 63/08
726/16

(Continued)

FOREIGN PATENT DOCUMENTS

JP 2008-299782 A 12/2008

OTHER PUBLICATIONS

Y. Sun, T. F. La Porta and P. Kermani, "A Flexible Privacy-Enhanced Location-Based Services System Framework and Practice," in IEEE Transactions on Mobile Computing, vol. 8, No. 3, pp. 304-321, Mar. 2009. (Year: 2009).*

(Continued)

*Primary Examiner* — Kari L Schmidt
(74) *Attorney, Agent, or Firm* — Studebaker & Brackett PC

(57) ABSTRACT

An information processing system includes an authentication server, a proxy authentication terminal, and an information processing device. The authentication server is connected to a wide-area line located outside a prescribed area, has an authentication privilege, and issues an authentication code. The proxy authentication terminal is connected to the authentication server through the wide-area line, has a proxy authentication privilege which serves as a proxy for the authentication privilege, and issues a proxy authentication code. The information processing device is connected to the proxy authentication terminal through a local-area line located within the prescribed area, receives the proxy authentication code from the proxy authentication terminal, and instructs processing of a job.

13 Claims, 10 Drawing Sheets

(56) References Cited

U.S. PATENT DOCUMENTS

| | | | | |
|---|---|---|---|---|
| 8,844,014 B2* | 9/2014 | Hong | G06F 21/34 | 235/382 |
| 9,342,762 B2* | 5/2016 | Nagasaki | G06K 15/005 | |
| 9,779,271 B2* | 10/2017 | Kanakarajan | H04W 12/126 | |
| 9,930,036 B2* | 3/2018 | Pramanik | H04W 12/08 | |
| 10,015,169 B2* | 7/2018 | Kennedy | G06F 21/55 | |
| 10,484,377 B1* | 11/2019 | Mossoba | H04L 63/0838 | |
| 11,240,215 B2* | 2/2022 | Klemm | H04W 4/021 | |
| 2003/0069915 A1* | 4/2003 | Clough | H04L 63/08 | 718/100 |
| 2004/0162076 A1* | 8/2004 | Chowdry | H04L 63/0281 | 455/445 |
| 2009/0172408 A1* | 7/2009 | Cheng | G06F 21/84 | 726/1 |
| 2012/0210399 A1* | 8/2012 | Jennings | G06F 21/6218 | 726/4 |
| 2013/0060635 A1* | 3/2013 | Walker | G06Q 30/0631 | 705/14.58 |
| 2013/0191902 A1* | 7/2013 | Friedl | G06F 21/41 | 726/7 |
| 2013/0198806 A1* | 8/2013 | Takatsu | H04L 63/08 | 726/3 |
| 2014/0118772 A1* | 5/2014 | Lim | G06F 3/1204 | 358/1.14 |
| 2014/0331272 A1* | 11/2014 | Gupta | H04W 12/64 | 726/1 |
| 2016/0021199 A1* | 1/2016 | Krimon | H04L 67/18 | 709/225 |
| 2016/0036794 A1* | 2/2016 | Adhya | H04W 12/50 | 726/4 |
| 2017/0332238 A1* | 11/2017 | Bansal | H04L 67/16 | |
| 2019/0028478 A1* | 1/2019 | Love | G07C 9/00571 | |
| 2019/0036975 A1* | 1/2019 | Beckman | H04L 67/10 | |
| 2019/0288985 A1* | 9/2019 | Chambers | H04L 63/0236 | |
| 2019/0312737 A1* | 10/2019 | Mani | H04L 9/3297 | |
| 2021/0014233 A1* | 1/2021 | Kuppannan | H04L 63/0263 | |

OTHER PUBLICATIONS

C. P. Suduwella, Y. S. Ranasinghe and K. de Zoysa, "Visible light communication based authentication protocol designed for location based network connectivity," 2017 Seventeenth International Conference on Advances in ICT for Emerging Regions (ICTer), 2017, pp. 1-8. (Year: 2017).*

* cited by examiner

INFORMATION PROCESSING SYSTEM, INFORMATION PROCESSING DEVICE, AND INFORMATION PROCESSING METHOD

INCORPORATION BY REFERENCE

The present application claims priority under 35 U.S.C. § 119 to Japanese Patent Application No. 2019-139862, filed on Jul. 30, 2019. The contents of this application are incorporated herein by reference in their entirety.

BACKGROUND

The present disclosure relates to an information processing system, an information processing device, and an information processing method.

An authentication system includes an authentication server and a proxy authentication server connected to each other through a network. When the authentication server is unusable in the authentication system, encrypted authentication information, which is transmitted to a terminal in advance, is sent to the proxy authentication server and the proxy authentication server decrypts the authentication information with a decryption key to perform proxy authentication.

SUMMARY

An information processing system according to an aspect of the present disclosure includes an authentication server, a proxy authentication terminal, and an information processing device. The authentication server is connected to a wide-area line located outside a prescribed area, has an authentication privilege, and issues an authentication code. The proxy authentication terminal is connected to the authentication server through the wide-area line, has a proxy authentication privilege which serves as a proxy for the authentication privilege, and issues a proxy authentication code. The information processing device is connected to the proxy authentication terminal through a local-area line located within a prescribed area, receives the proxy authentication code from the proxy authentication terminal, and instructs processing of a job.

An information processing device according to another aspect of the present disclosure is for processing information. The information processing device is connected to an authentication server through a wide-area line located outside a prescribed area, and is connected to a proxy authentication terminal and a processing device through a local-area line located within the prescribed area. The authentication server has an authentication privilege. The proxy authentication terminal has a proxy authentication privilege which serves as a proxy for the authentication privilege. The processing device processes a job for which a proxy authentication code is issued. The information processing device includes a requesting section and a receiving section. The requesting section requests the proxy authentication terminal to perform proxy authentication so as to issue the proxy authentication code. The receiving section receives the proxy authentication code.

An information processing method according to yet another aspect of the present disclosure includes: issuing a proxy authentication code based on a proxy authentication privilege which serves as a proxy for an authentication privilege; receiving the proxy authentication code; instructing processing of a job; and processing the job for which the proxy authentication code is issued.

DETAILED DESCRIPTION

Figure 1:
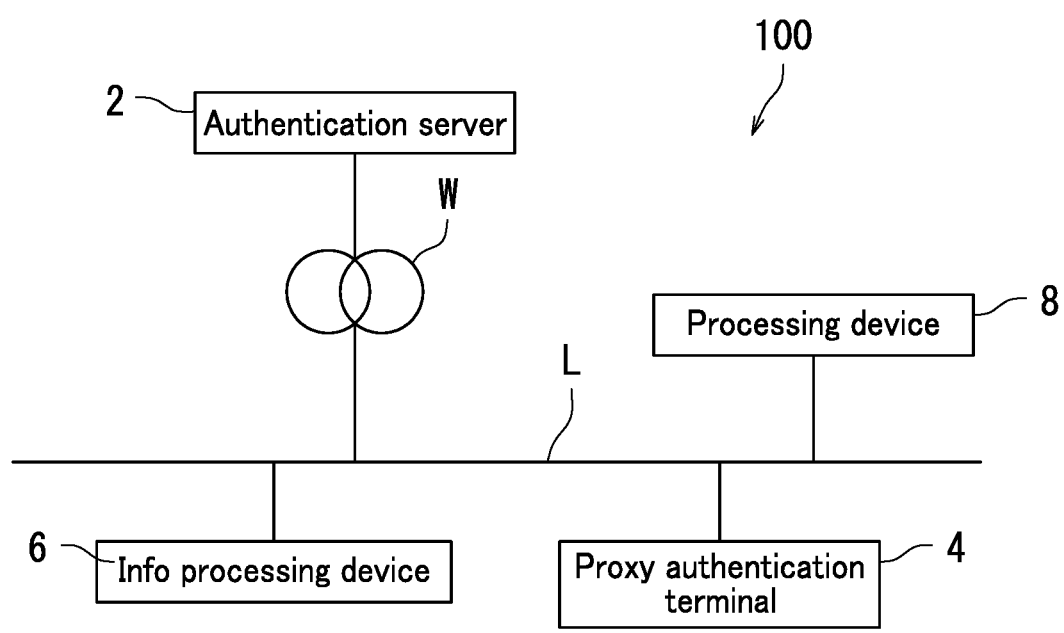
FIG. 1 is a diagram illustrating a configuration of an information processing system according to an embodiment of the present disclosure.

The following describes embodiments of the present disclosure with reference to the accompanying drawings. Elements that are the same or equivalent are labeled with the same reference signs in the drawings and description thereof is not repeated.

First Embodiment

An information processing system 100 according to a first embodiment of the present disclosure is described with reference to FIG. 1. FIG. 1 is a diagram illustrating the information processing system 100 in the present embodiment.

As illustrated in FIG. 1, the information processing system 100 includes an authentication server 2, a proxy authentication terminal 4, an information processing device 6, and a processing device 8.

As an example, the information processing system 100 is a system in which the authentication server 2 is connected to the proxy authentication terminal 4, the information processing device 6, and the processing device 8 through a wide-area line W and a local-area line L. The authentication server 2 is located at the headquarters of an organization, and the proxy authentication terminal 4, the information processing device 6, and the processing device 8 are located at a regional operating division of the organization.

In the information processing system 100, the proxy authentication terminal 4 performs proxy authentication on a job instructed for processing by the information processing device 6 and the processing device 8 processes the job in a case where the authentication server 2 is unable to perform authentication due to a fault occurring in the wide-area line W.

The authentication server 2 is connected to the wide-area line W located outside a prescribed area, has an authentication privilege, and issues an authentication code.

As an example, the prescribed area is inside of one building. As another example, the prescribed area is a regional operating division. As yet another example, the prescribed area is inside of a gateway or a router.

As an example, the wide-area line W is a wide area network (WAN). As another example, the wide-area line W is outside a gateway or a router.

That is, as an example, the authentication server 2 is a server located at a headquarters and is connected to the wide-area line W.

The authentication privilege is a privilege through which the information processing system 100 authorizes the processing device 8 connected to the local-area line L to be capable of processing a job as a terminal. That is, the authentication privilege functions as a license which authorizes a terminal. Accordingly, as long as the authentication server 2 has the authentication privilege, the authentication server 2 keeps the authentication privilege as a license. The authentication privilege is implemented as a program. The authentication privilege is stored in later-described server storage 22 of the authentication server 2.

As an example, the local-area line L is a local area network (LAN). As another example, the local-area line L is inside of a gateway or a router.

The authentication code is a code which indicates whether or not the information processing system 10 authorizes the processing device 8 connected to the local-area line L to be capable of processing a job as a terminal. As described later, the authentication code functions as a ticket which means authorization or unauthorization when the authentication server 2 receives an authentication request from the information processing device 6. Accordingly, in response to the authentication request from the information processing device 6 to the authentication server 2, the authentication code is passed from the authentication server 2 to the information processing device 6 as a ticket in which authorization or unauthorization is indicated. The authentication code is implemented as a program. The authentication code is issued to the information processing device 6 by a later-described authentication code issuing section 25 of the authentication server 2.

The proxy authentication terminal 4 is connected to the authentication server 2 through the wide-area line W, has a terminal information list and a proxy authentication privilege which serves as a proxy for the authentication privilege, and issues a proxy authentication code. The information processing device 6 also has a terminal information list and a proxy authentication privilege which serves as a proxy for the authentication privilege, and may also issue a proxy authentication code.

The proxy authentication terminal 4 is not a server. Examples of the proxy authentication terminal 4 include a workstation, a desktop personal computer, a notebook personal computer, a mobile phone, a smartphone, a tablet computer, and an Internet of things (IoT) device (a RASPBERRY PI (registered Japanese trademark), for example). That is, the proxy authentication terminal 4 has the same configuration and function as the later-described information processing device 6, and may instruct the later-described processing device 8 to process a job.

That is, a work-use personal computer, which normally generates documents or instructs the processing device 8 to process a job, performs authentication work by proxy during an emergency such as a fault occurring in the wide-area line W in the present embodiment. Therefore, the present embodiment is significant in that an expensive server is not needed and proxy authentication work can be performed by an inexpensive work-use personal computer.

For the sake of simplicity, description is limited to a personal computer corresponding to the proxy authentication terminal 4 in the present embodiment. However, the personal computer corresponding to the proxy authentication terminal 4 is interchangeable with a personal computer corresponding to the information processing device 6.

At the same time, a "proxy authentication server" described in the field of the background art is a copy server of an authentication server, and does not generally have a function of instructing the processing device 8 to process a job. Furthermore, the present embodiment is not intended for a case where an expensive copy server is connected to the local-area line L to perform proxy authentication.

As an example, the proxy authentication privilege is a copy of the authentication privilege. The proxy authentication privilege is implemented as a program. The proxy authentication privilege is stored in later-described terminal storage 45 of the proxy authentication terminal 4. The proxy authentication privilege may also be stored in unillustrated storage of the information processing device 6.

The proxy authentication code is a code which indicates whether or not the information processing system 100 authorizes the processing device 8 connected to the local-area line L to be capable of processing a job as a terminal. The proxy authentication code is implemented as a program. The proxy authentication code is issued to the information processing device 6 by a later-described proxy authentication code issuing section 43 of the proxy authentication terminal 4.

The information processing device 6 is connected to the authentication server 2 with the authentication privilege through the wide-area line W located outside the prescribed area, and is connected to the proxy authentication terminal 4 through the local-area line L located within the prescribed area. The information processing device 6 receives the proxy authentication code from the proxy authentication terminal 4 and instructs the processing device 8 to process a job.

That is, in a case where a fault has occurred in the wide-area line W and the authentication server 2 is unable to issue the authentication code, the information processing device 6 requests the proxy authentication terminal 4 to perform proxy authentication. The information processing device 6 may also request itself to perform proxy authentication. That is, the information processing device 6 may have the proxy authentication privilege and may perform proxy authentication of the information processing device 6. Furthermore, the information processing device 6 need not specify a partner to request performance of proxy authentication. That is, the information processing device 6 may request performance of proxy authentication through multi-address transmission on the local-area line L.

The information processing device 6 instructs the processing device 8 to process a job upon receiving the proxy authentication code indicating authorization from the proxy authentication terminal 4.

Examples of the information processing device 6 include a workstation, a desktop personal computer, a notebook personal computer, a mobile phone, a smartphone, and a tablet computer.

The processing device 8 is connected to the information processing device 6 through the local-area line L and processes a job as instructed by the information processing device 6 to which the proxy authentication code is issued. Note that the proxy authentication code may be issued for a job which the information processing device 6 is attempting to process. In this case, the information processing device 6 instructs the processing device 8 to process a job for which the proxy authentication code is issued. The processing device 8 receives the instruction from the information processing device 6 and processes the job for which the proxy authentication code is issued.

Examples of the processing device 8 include a scanner, a printer, and a multifunction peripheral. A multifunction peripheral generally includes a reading section and an image forming section, reads an image recorded on a document, and forms an image on a sheet.

In the present embodiment, interruption to work using the processing device 8 connected through the local-area line L for example is suitably prevented because the proxy authentication terminal 4 connected through the local-area line L can perform proxy authentication even when a fault occurs in the wide-area line W connecting the information processing device 6 to the authentication server 2.

Furthermore, unlike a case in which multiple authentication servers 2 are provided, it is not necessary to provide a new and expensive device, and authentication work can be performed by an inexpensive device by providing a proxy authentication privilege to an existing terminal.

Figure 2:
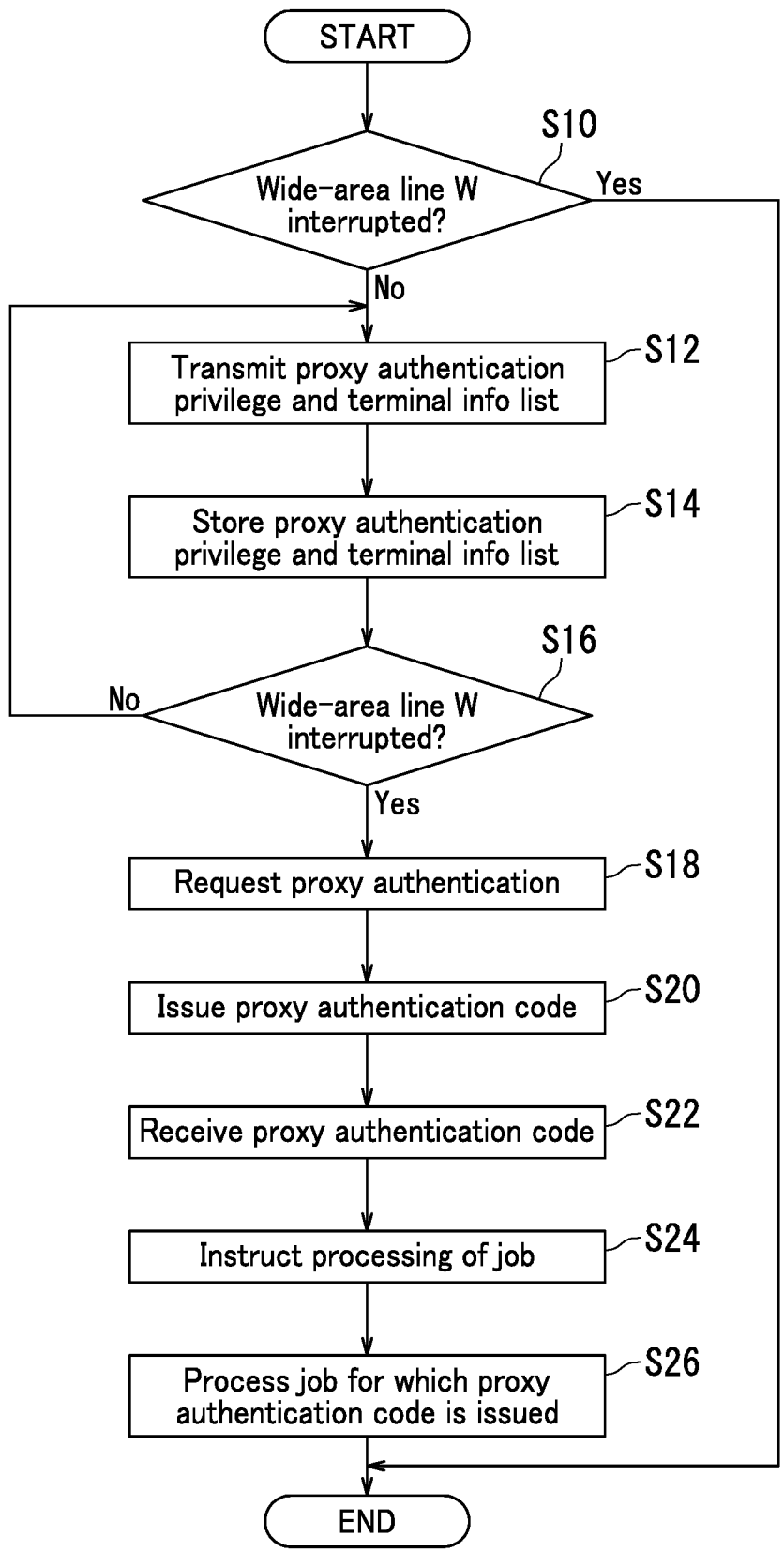
FIG. 2 is a flowchart depicting an information processing method in the embodiment.

Next, operation of the information processing system 100 in the first embodiment is described with reference to FIG. 2. FIG. 2 is a flowchart depicting an information processing method implemented by the information processing system 100 in the present embodiment. As illustrated in FIG. 2, the process includes Steps S10 to S26. Specifically, the information processing method is as follows.

First, in Step S10, it is determined whether or not the wide-area line W is interrupted. When the wide-area line W is not interrupted (No in Step S10), the process advances to Step S12. When the wide-area line W is interrupted (Yes in Step S10), the process ends.

In Step S12, the authentication server 2 transmits a proxy authentication privilege and a terminal information list. The process advances to Step S14.

In Step S14, the proxy authentication terminal 4 stores the proxy authentication privilege and the terminal information list. The process advances to Step S16.

In Step S16, the information processing device 6 determines whether or not the wide-area line W is interrupted. When the wide-area line W is interrupted (Yes in Step S16), the process advances to Step S18. When the wide-area line W is not interrupted (No in Step S18), the process advances to Step S12.

In Step S18, the information processing device 6 requests proxy authentication. The process advances to Step S20.

In Step S20, the proxy authentication terminal 4 issues a proxy authentication code. The process advances to Step S22.

In Step S22, the information processing device 6 receives the proxy authentication code. The process advances to Step S24.

In Step S24, the information processing device 6 instructs processing of a job. The process advances to Step S26.

In Step S26, the processing device 8 processes the job for which the proxy authentication code is issued. The process then ends.

Second Embodiment

Figure 3:
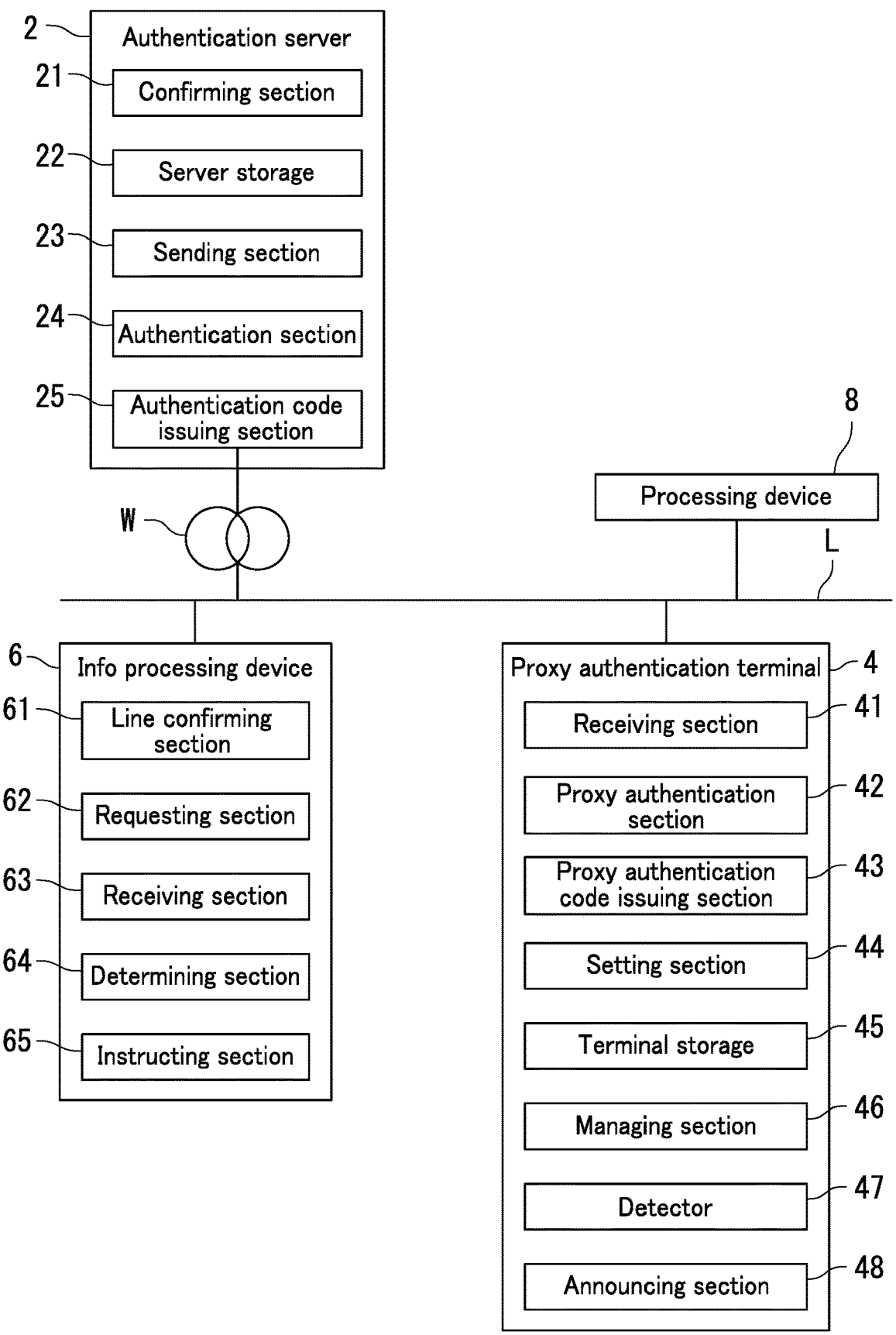
FIG. 3 is a diagram illustrating the configuration of the information processing system according to an embodiment.

Next, a configuration of the information processing system 100 according to a second embodiment is described with reference to FIG. 3. FIG. 3 is a diagram illustrating the configuration of the information processing system 100 in the second embodiment.

First, the configuration of the authentication server 2 is described in detail with reference to FIG. 3. As illustrated in FIG. 3, the authentication server 2 includes a confirming section 21, server storage 22, a transmission section 23, an authentication section 24, and an authentication code issuing section 25. The confirming section 21 confirms whether or not a fault has occurred in the wide-area line W. The server storage 22 stores therein an authentication privilege and a terminal information list to which the information processing device 6 or the proxy authentication terminal 4 is registered. The transmission section 23 transmits the proxy authentication privilege to the information processing device 6 or the proxy authentication terminal 4 registered in the terminal information list. The authentication section 24 performs authentication in response to the authentication request. The authentication code issuing section 25 issues an authentication code to the information processing device 6.

The confirming section 21, the transmission section 23, the authentication section 24, and the authentication code issuing section 25 are implemented by a processor such as a central processing unit (CPU). The processor executes a computer program stored in the server storage 22 to control the confirming section 21, the transmission section 23, the authentication section 24, and the authentication code issuing section 25.

The confirming section 21 sends a state confirmation signal to the wide-area line W. The state confirmation signal is a signal for confirming whether or not a fault has occurred in the wide-area line W. An unillustrated repeater, for example, is located in the wide-area line W. The repeater sends a response signal in response to the state confirmation signal. The confirming section 21 receives the response signal and determines whether or not a fault has occurred in the wide-area line W.

The server storage 22 stores the terminal information list to which the proxy authentication terminal 4 and the information processing device 6 connected to the local-area line L are registered. The server storage 22 further stores the authentication privilege therein. The processing device 8 may also be registered to the terminal information list.

When a proxy authentication terminal 4 or an information processing device 6 is newly connected to the local-area line L, the server storage 22 registers the proxy authentication terminal 4 or the information processing device 6 to the terminal information list. When the proxy authentication terminal 4 or the information processing device 6 is disconnected from the local-area line L, the server storage 22 deletes the proxy authentication terminal 4 or the information processing device 6 from the terminal information list.

The server storage 22 includes a storage device and stores data and computer programs therein. Specifically, the server storage 22 includes a main storage device such as semiconductor memory and an auxiliary storage device such as either or both of semiconductor memory and a hard disk drive.

The server storage 22 is not limited to a constituent element of the authentication server 2. The server storage 22 may be located in a device other than the authentication server 2.

The transmission section 23 transmits the proxy authentication privilege and the terminal information list to the proxy authentication terminal 4 registered in the terminal information list when a fault has not occurred in the wide-area line W. The transmission section 23 may also transmit the proxy authentication privilege and the terminal information list to the information processing device 6 registered in the terminal information list when a fault has not occurred in the wide-area line W.

A plurality of local-area lines L may be connected to the wide-area line W. The transmission section 23 may have a terminal information list of the local-area lines L. The transmission section 23 may transmit the proxy authentication privilege and the terminal information list to the information processing device 6 or the proxy authentication terminal 4 connected to a designated one of the local-area lines L.

The transmission section 23 may further assign a validity limit to the transmitted proxy authentication privilege. The proxy authentication privilege which is assigned a validity limit expires when the validity limit elapses.

The transmission section 23 may assign a validity limit indicating a specific date or time to the proxy authentication privilege, for example. The transmission section 23 may set the validity limit of the proxy authentication privilege to until the power of the proxy authentication terminal 4 or the information processing device 6 is turned off, for example.

The transmission section 23 may assign a proxy authentication privilege with a new validity limit to the proxy authentication terminal 4 or the information processing device 6 each time the power of the proxy authentication terminal 4 or the information processing device 6 is turned off.

The transmission section 23 may assign a validity limit such that the proxy authentication privilege expires upon detection of restoration of the wide-area line W through a later-described state confirmation signal.

In the present embodiment, the proxy authentication privilege can be suitably prevented from being hacked due to long-term use of the proxy authentication privilege. The proxy authentication privilege can also be suitably prevented from being misused.

As described later, the authentication section 24 performs authentication in response to an authentication request by the information processing device 6 after the wide-area line W has been restored from a fault.

As a result of the authentication section 24 performing authentication, the authentication code issuing section 25 issues an authentication code indicating whether or not the information processing device 6 is authorized to the information processing device 6.

In the present embodiment, the authentication server 2 can manage the proxy authentication terminal 4 or the information processing device 6 using the terminal information list. Furthermore, the authentication server 2 can distribute a proxy authentication privilege to the proxy authentication terminal 4 or the information processing device 6 registered in the terminal information list.

Next, the configuration of the proxy authentication terminal 4 is described in detail with reference to FIG. 3. As illustrated in FIG. 3, the proxy authentication terminal 4 includes a receiving section 41, a proxy authentication section 42, a proxy authentication code issuing section 43, a setting section 44, terminal storage 45, a managing section 46, a detector 47, and an announcing section 48.

The receiving section 41, the proxy authentication section 42, the proxy authentication code issuing section 43, the setting section 44, the managing section 46, the detector 47, and the announcing section 48 are implemented by a processor such as a CPU. The processor executes a computer program stored in the terminal storage 45 to control the receiving section 41, the proxy authentication section 42, the proxy authentication code issuing section 43, the setting section 44, the managing section 46, the detector 47, and the announcing section 48.

The receiving section 41 receives the proxy authentication privilege and the terminal information list. That is, the receiving section 41 receives the proxy authentication privilege and the terminal information list transmitted by the transmission section 23 of the authentication server 2.

The proxy authentication section 42 performs proxy authentication in response to the proxy authentication request from the information processing device 6. The proxy authentication section 42 performs proxy authentication in response to the proxy authentication request performed by the information processing device 6 based on the proxy authentication privilege received by the receiving section 41. Specifically, the proxy authentication section 42 performs proxy authentication indicating authorization when the information processing device 6 is registered in the terminal information list. The proxy authentication section 42 performs proxy authentication indicating that authorization is not granted (proxy authentication indicating unauthorization) when the information processing device 6 is not registered in the terminal information list.

The proxy authentication code issuing section 43 issues a proxy authentication code to the information processing device 6. When the proxy authentication section 42 performs proxy authentication, the proxy authentication code indicating whether proxy authentication is authorized or is not authorized (unauthorized) is issued to the information processing device 6.

The setting section 44 sets the proxy authentication terminal 4 to refuse to receive a proxy authentication privilege. That is, in a case where there is a plurality of proxy authentication terminals 4, the burden placed on each proxy authentication terminal 4 is different. Therefore, the setting section 44 can set an overburdened proxy authentication terminal 4 to be capable of refusing to receive a proxy authentication privilege.

The setting section 44 can set the receiving section 41 so that a proxy authentication terminal 4 which has capacity for burden can receive a proxy authentication privilege.

The terminal storage 45 stores the proxy authentication privilege and the terminal information list therein. The terminal storage 45 stores therein the proxy authentication privilege and the terminal information list received by the receiving section 41.

The terminal storage 45 includes a storage device and stores data and computer programs therein. Specifically, the terminal storage 45 includes a main storage device such as semiconductor memory and an auxiliary storage device such as either or both of semiconductor memory and a hard disk drive.

The managing section 46 assigns a validity limit to the proxy authentication privilege and invalidates the proxy authentication privilege when the validity limit elapses. The proxy authentication privilege is program data, and therefore carries the risk of being externally hacked. Therefore, the managing section 46 assigns a validity limit to the proxy authentication privilege. The proxy authentication terminal 4 is unable to use a proxy authentication privilege for which a specific period has elapsed. The proxy authentication code issuing section 43 is unable to issue a proxy authentication code to the information processing device 6.

The detector 47 detects that the wide-area line W has been restored and outputs line information. For example, the detector 47 regularly sends a state confirmation signal to the wide-area line W through the local-area line L. When a fault has occurred in the wide-area line W, the state confirmation signal does not reach the authentication server 2. When the fault in the wide-area line W is resolved, the state confirmation signal reaches the authentication server 2. The repeater located in the wide-area line W may send back a response signal according to the state of the wide-area line W in response to the state confirmation signal.

Upon receiving the response signal, the authentication server 2 sends the response signal back to the proxy authentication terminal 4 through the wide-area line W and the local-area line L. The detector 47 of the proxy authentication terminal 4 receives the response signal and outputs line information indicating that the wide-area line W has been restored. The detector 47 may output the line information to a later-described line confirming section 61 of the information processing device 6.

The announcing section 48 announces information related to the proxy authentication terminal 4 or the information processing device 6 to the authentication server 2 based on the line information. Specifically, while the wide-area line W is interrupted, the announcing section 48 sends information to the authentication server 2 as the line information. Here, the information indicates which proxy authentication terminal 4 has performed proxy authentication how many times and whether the information processing device 6 has received proxy authentication and instructed the processing device 8 to process a job.

The announcing section 48 may also send information to the authentication server 2 as the line information. Here, the information indicates whether a new proxy authentication terminal 4 or a new information processing device 6 is connected to the local-area line L or whether either of the proxy authentication terminal 4 or the information processing device 6 has been disconnected from the local-area line L.

The server storage 22 of the authentication server 2 updates information about the information processing device 6 or the proxy authentication terminal 4 in the terminal information list.

In the present embodiment, the proxy authentication terminal 4 can receive the proxy authentication privilege and the terminal information list through the receiving section 41 and can perform proxy authentication through the proxy authentication section 42 in response to a proxy authentication request from the information processing device 6. Because the proxy authentication code issuing section 43 issues a proxy authentication code, the proxy authentication code functions as a certificate of performance of proxy authentication.

Also in the present embodiment, an overburdened proxy authentication terminal 4 can refuse to receive a proxy authentication privilege and proxy authentication can be performed by a proxy authentication terminal 4 with capacity for burden.

Also in the present embodiment, the proxy authentication privilege can be suitably prevented from being hacked due to long-term use of the proxy authentication privilege. The proxy authentication privilege can also be suitably prevented from being misused.

Next, the configuration of the information processing device 6 is described in detail with reference to FIG. 3. As illustrated in FIG. 3, the information processing device 6 is connected to the authentication server 2 located outside the prescribed area through the wide-area line W, and is connected to the proxy authentication terminal 4 and the processing device 8 through the local-area line L. The authentication server 2 has an authentication privilege. The proxy authentication terminal 4 has a proxy authentication privilege which serves as a proxy for the authentication privilege. The processing device 8 processes a job for which a proxy authentication code is issued. The information processing device 6 includes a line confirming section 61, a requesting section 62, a receiving section 63, a determining section 64, and an instructing section 65.

The information processing device 6 differs in behavior between a case where the wide-area line W is interrupted due to a fault and a case where the wide-area line W has been restored from a fault. First, the case where the wide-area line W is interrupted due to a fault is described.

The line confirming section 61 sends a state confirmation signal to the wide-area line W. The state confirmation signal is a signal which confirms whether or not a fault has occurred in the wide-area line W. The repeater located in the wide-area line W sends a response signal in response to the state confirmation signal. The line confirming section 61 receives the response signal and determines whether or not a fault has occurred in the wide-area line W.

However, as described previously, in a case where the detector 47 is already outputting line information to the line confirming section 61, it is not necessary for the line confirming section 61 to send a state confirmation signal.

In a case where a fault is determined to have occurred in the wide-area line W through a response signal received from the repeater, the requesting section 62 performs a proxy authentication request for the proxy authentication terminal 4 to issue a proxy authentication code.

That is, in a case where a fault has occurred in the wide-area line W, the requesting section 62 performs a proxy authentication request to the proxy authentication terminal 4 based on the response information because the authentication server 2 is unable to perform authentication.

The receiving section 63 receives a proxy authentication code issued by the proxy authentication code issuing section 43 of the proxy authentication terminal 4.

The determining section 64 determines whether the proxy authentication code indicates authorization or unauthorization. In a case where the information processing device 6 is registered to the terminal information list stored by the server storage 22 of the authentication server 2, the proxy authentication code is a code indicating that the information processing device 6 is authorized.

In a case where a plurality of proxy authentication codes are issued, the determining section 64 may determine that the information processing device 6 or the job is authorized when all of the received proxy authentication codes indicate authorization. Furthermore, the determining section 64 may determine that the information processing device 6 or the job is not authorized when one of the received proxy authentication codes indicates unauthorization. Additionally, the determining section 64 may determine that the information processing device 6 or the job is authorized when most of the received proxy authentication codes indicate authorization.

Accordingly, the determining section 64 can determine whether or not the information processing device 6 is registered to the terminal information list based on the proxy authentication code. That is, the determining section 64 can determine whether the information processing device 6 is authorized or is not authorized based on the proxy authentication code.

The instructing section 65 instructs the processing device 8 to process a job when the proxy authentication code indicates authorization. The instructing section 65 may be set so as to be able to instruct the processing device 8 to process a job only when the proxy authentication code indicates authorization. Furthermore, the processing device 8 may be set to process only jobs as instructed by an information processing device 6 for which the proxy authentication code indicates authorization.

The proxy authentication code may indicate authorization or unauthorization with respect to a job but not an information processing device 6. In this case, the information processing device 6 may be set to be able to instruct the processing device 8 to process only jobs having a proxy authentication code which indicates authorization. The processing device 8 may be set to be able to process only jobs having a proxy authentication code which indicates authorization.

In the present embodiment, the information processing device 6 can request proxy authentication from the proxy authentication terminal 4 connected to the local-area line L even when a fault has occurred in the wide-area line W. By receiving a proxy authentication code, the information processing device 6 can cause the processing device 8 to process a job which has received proxy authentication.

Also in the present embodiment, the information processing device 6 can process, using the processing device 8, only jobs which have received a proxy authentication code indicating authorization because the determining section 64 determines whether the proxy authentication code indicates authorization or unauthorization. A situation in which an information processing device 6 that has not received authorization processes a job can be suitably prevented.

Also in the present embodiment, in a case where a plurality of authentication codes is received, a proportion of authorization to non-authorization can be appropriately selected for authorization determination according to a degree of security.

Next, a case where the wide-area line W has been restored from a fault is described. For example, the state confirmation signal sent by the detector 47 of the proxy authentication terminal 4 is received by the repeater of the wide-area line W. When a fault has occurred in the wide-area line W, the repeater outputs a response signal indicating that a fault has occurred in the wide-area line W.

Thereafter, the fault is resolved and the wide-area line W is restored, and the repeater outputs a response signal indicating that the wide-area line W has been restored in response to the state confirmation signal sent by the detector 47 of the proxy authentication terminal 4 upon reopening of the wide-area line W. The detector 47 of the proxy authentication terminal 4 detects that the wide-area line W has been restored through the response signal and outputs line information.

After the wide-area line W has been restored, the information processing device 6 performs an authentication request to the authentication server 2. The requesting section 62 performs an authentication request for the authentication server 2 to issue an authentication code.

The authentication section 24 of the authentication server 2 performs authentication in response to the authentication request from the information processing device 6.

According to a result of authentication by the authentication section 24, the authentication code issuing section 25 issues an authentication code indicating whether or not the information processing device 6 is authorized to the information processing device 6.

The receiving section 63 of the information processing device 6 receives the authentication code issued by the authentication code issuing section 25 of the authentication server 2.

The determining section 64 determines whether the authentication code indicates authorization or unauthorization.

The instructing section 65 instructs the processing device 8 to process a job when the authentication code indicates authorization.

In the present embodiment, after the wide-area line W is interrupted, the detector 47 or the line confirming section 61 appropriately monitors the wide-area line W and detects restoration of the wide-area line W. The information processing device 6 can receive authentication from the authentication server 2.

Figure 4:
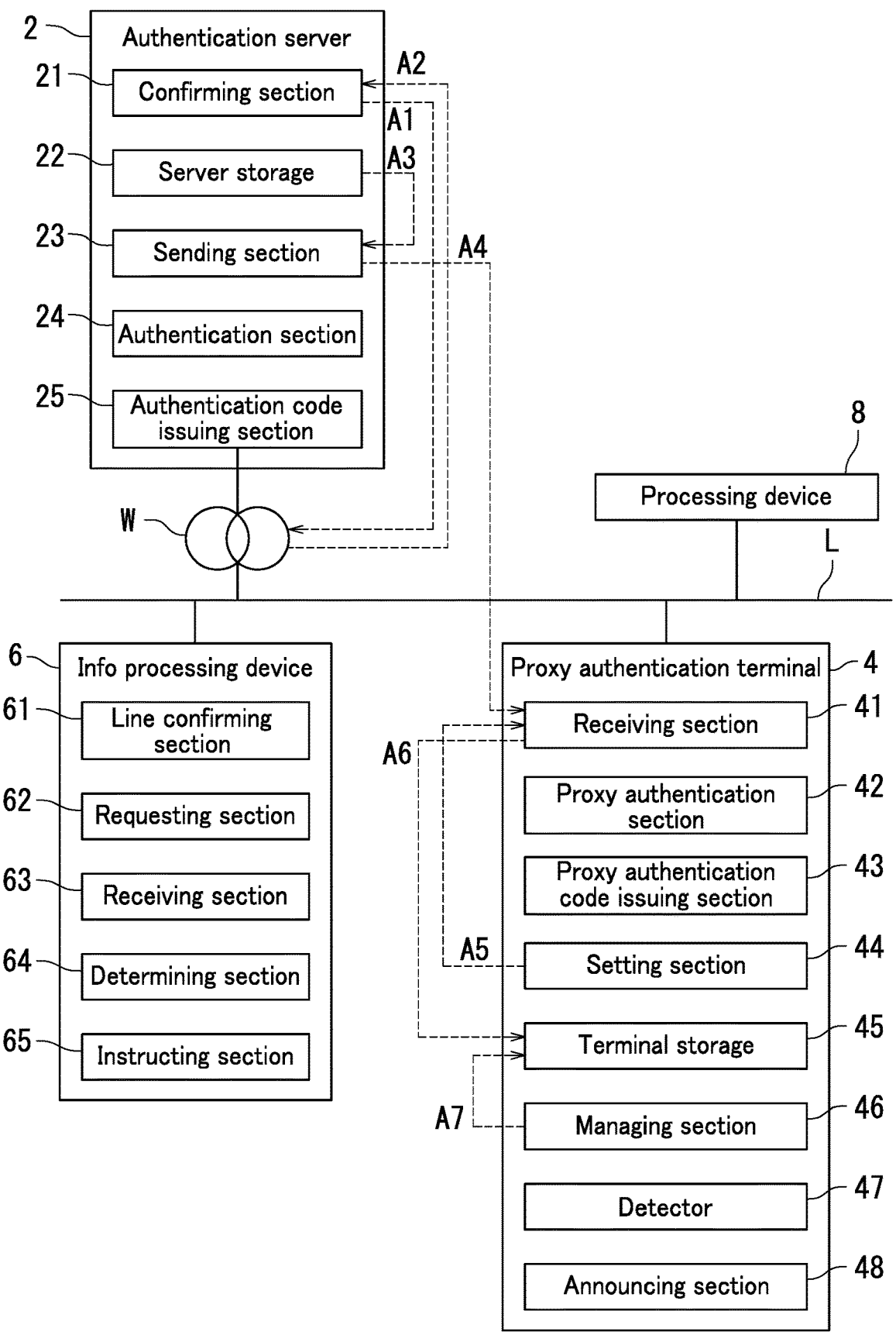
FIG. 4 is a diagram illustrating an information flow of the information processing system in the embodiment.
Figure 5:
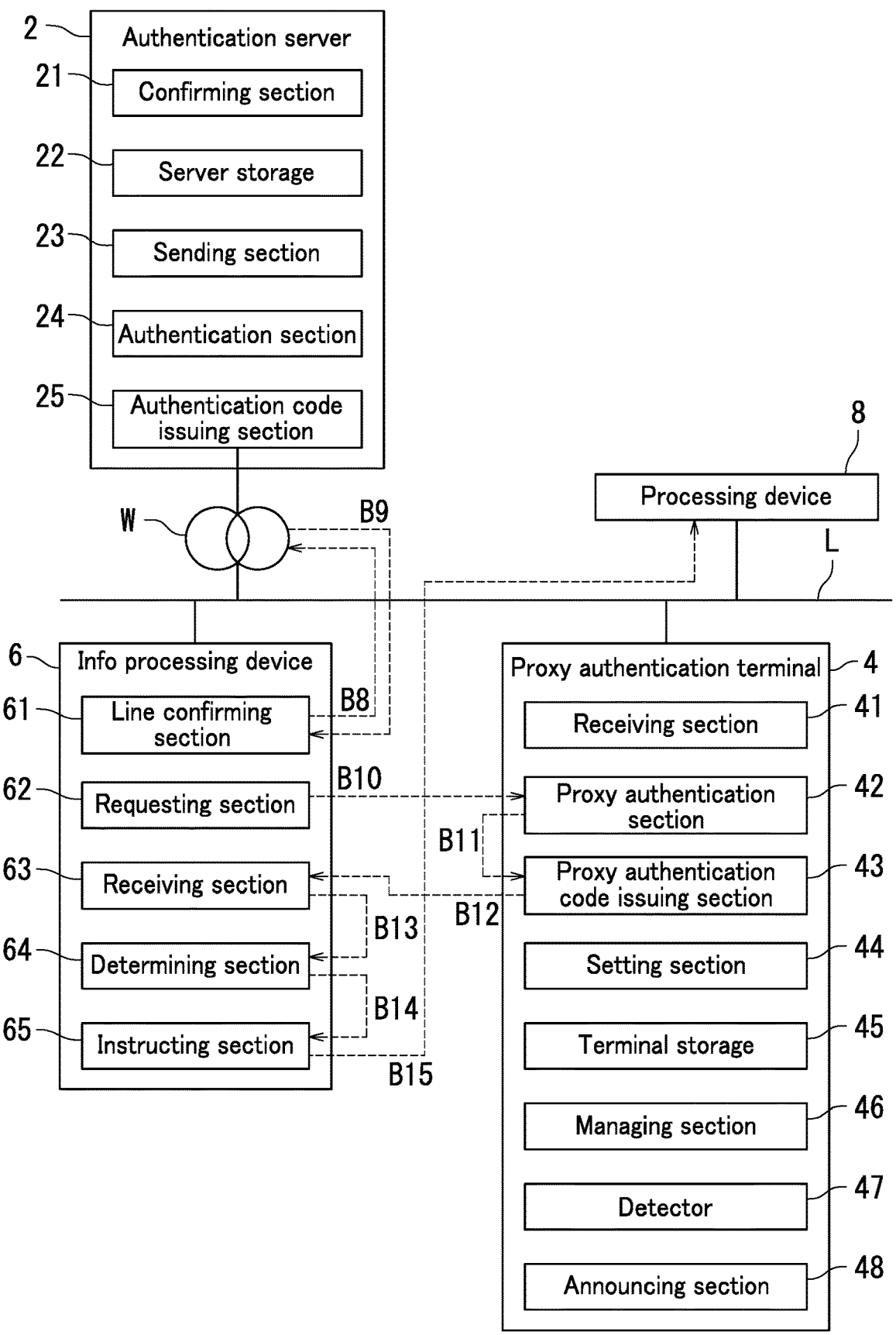
FIG. 5 is a diagram illustrating an information flow of the information processing system in the embodiment.
Figure 6:
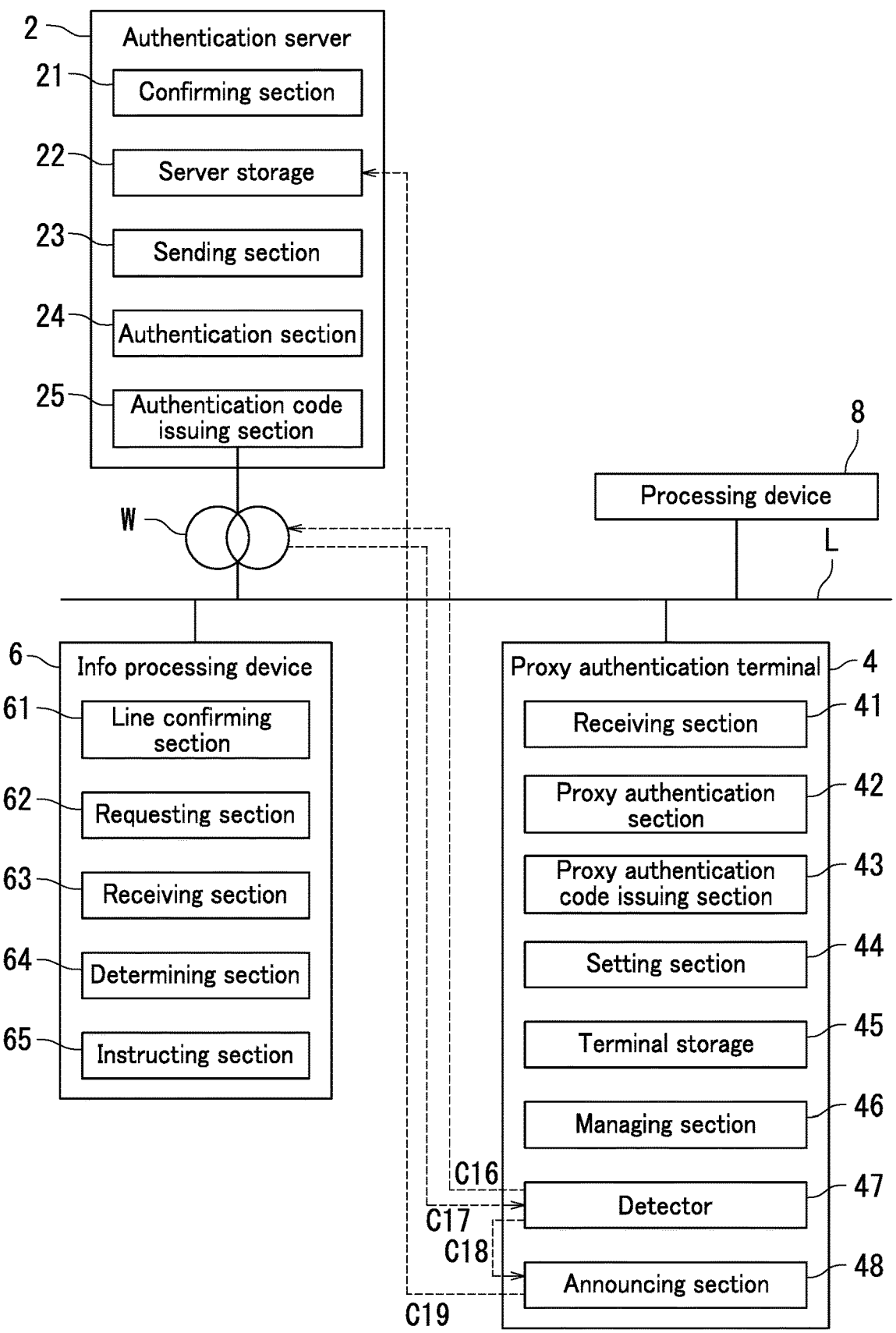
FIG. 6 is a diagram illustrating an information flow of the information processing system in the embodiment.
Figure 7:
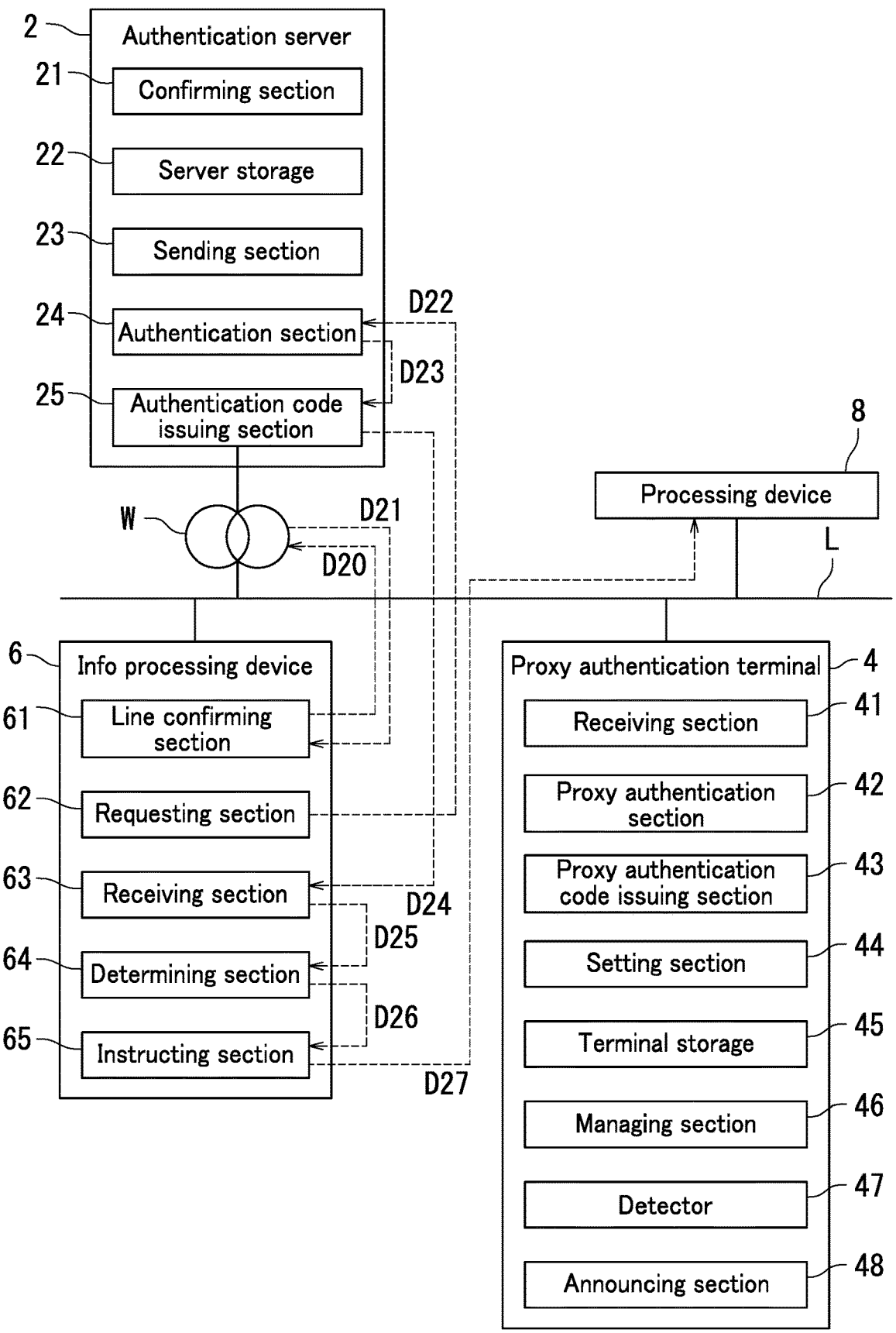
FIG. 7 is a diagram illustrating an information flow of the information processing system in the embodiment.

Next, information flows in the information processing system 100 in the present embodiment are described with reference to FIGS. 4 to 7. FIGS. 4 to 7 are diagrams which illustrate the respective information flows in the information processing system 100 in the present embodiment. Specifically, FIG. 4 illustrates a flow until the authentication server 2 distributes the proxy authentication privilege and the terminal information list to the proxy authentication terminal 4 when a fault has not occurred in the wide-area line W. FIG. 5 illustrates a flow until the information processing device 6 receives proxy authentication from the proxy authentication terminal 4 and processes a job using the processing device 8. FIG. 6 illustrates a flow when confirming whether or not the wide-area line W has been restored. FIG. 7 illustrates a flow until the information processing device 6 receives authentication from the authentication server 2 and processes a job using the processing device 8 after the wide-area line W has been restored.

First, in flow A1 as illustrated in FIG. 4, the confirming section 21 of the authentication server 2 for example outputs a state confirmation signal to the repeater in the wide-area line W. In flow A2, the repeater outputs a response signal indicating whether or not a fault has occurred in the wide-area line W. In flow A3, the authentication server 2 reads out the stored terminal information list and authentication privilege from the server storage 22 and outputs the terminal information list and the authentication privilege to the transmission section 23. In flow A4, the transmission section 23 transmits the terminal information list and a proxy authentication privilege which is a copy of the authentication privilege to the proxy authentication terminal 4 through the wide-area line W when a fault has not occurred in the wide-area line W. The receiving section 41 of the proxy authentication terminal 4 receives the proxy authentication privilege and the terminal information list.

In flow A5, the setting section 44 sets the proxy authentication terminal 4 to be able to refuse to receive a proxy authentication privilege when the proxy authentication terminal 4 is overburdened. The transmission section 23 does not transmit the proxy authentication privilege to the proxy authentication terminal 4 when the proxy authentication terminal 4 is set to be able to refuse by the setting section 44. In flow A6, the receiving section 41 stores the proxy authentication privilege and the terminal information list in the terminal storage 45. In flow A7, the managing section 46 assigns a validity limit to the proxy authentication privilege and the terminal information list stored in the terminal storage 45.

Next, in flow B8 as illustrated in FIG. 5, the line confirming section 61 of the information processing device 6 sends the state confirmation signal to the repeater in the wide-area line W. In flow B9, the repeater sends back a response signal indicating the state of the wide-area line W to the line confirming section 61.

In flow B10, the requesting section 62 requests proxy authentication from the proxy authentication section 42 of the proxy authentication terminal 4 when the line confirming section 61 receives a response signal indicating that a fault has occurred in the wide-area line W. In flow B11, the proxy authentication section 42 authenticates the information processing device 6 based on the terminal information list transmitted from the authentication server 2. In flow B12, the proxy authentication code issuing section 43 issues a proxy authentication code indicating that the information processing device 6 is authorized or a proxy authentication code indicating that the information processing device 6 is not authorized.

In flow B13, the receiving section 63 of the information processing device 6 receives the proxy authentication code and outputs the proxy authentication code to the determining section 64. In flow B14, the determining section 64 determines whether the information processing device 6 is authorized or not authorized based on the proxy authentication code. In flow B15, the instructing section 65 instructs the processing device 8 to process a job when the proxy authentication code indicates that the information processing device 6 is authorized.

Next, in flow C16 as illustrated in FIG. 6, the detector 47 of the proxy authentication terminal 4 sends a state confirmation signal to the repeater in the wide-area line W. In flow C17, the repeater sends back a response signal indicating the state of the wide-area line W to the detector 47 of the proxy authentication terminal 4. In flow C18, the detector 47 outputs line information indicating that the wide-area line W has been restored to the announcing section 48 when the response signal indicates that the wide-area line W has been restored. In flow C19, the announcing section 48 announces information related to the proxy authentication terminal 4 or the information processing device 6 to the server storage 22 of the authentication server 2.

Next, in flow D20 as illustrated in FIG. 7, the line confirming section 61 sends a state confirmation signal to the wide-area line W. In flow D21, the repeater located in the wide-area line W sends a response signal in response to the state confirmation signal. The line confirming section 61 receives the response signal and determines whether or not a fault has occurred in the wide-area line W. In flow D22, the requesting section 62 of the information processing device 6 performs an authentication request to the authentication section 24 of the authentication server 2 when the line confirming section 61 confirms that the wide-area line W has been restored based on the response signal. In flow D23, the authentication section 24 authenticates the information processing device 6 based on the terminal information list. In flow D24, the authentication code issuing section 25 issues an authentication code indicating that the information processing device 6 is authorized or an authentication code indicating that the information processing device 6 is not authorized.

In flow D25, the receiving section 63 receives the authentication code and outputs the authentication code to the determining section 64. In flow D26, the determining section 64 determines whether or not the information processing device 6 is authorized based on the authentication code. In flow D27, the instructing section 65 instructs the processing device 8 to process a job when the authentication code indicates that the information processing device 6 is authorized.

Figure 8:
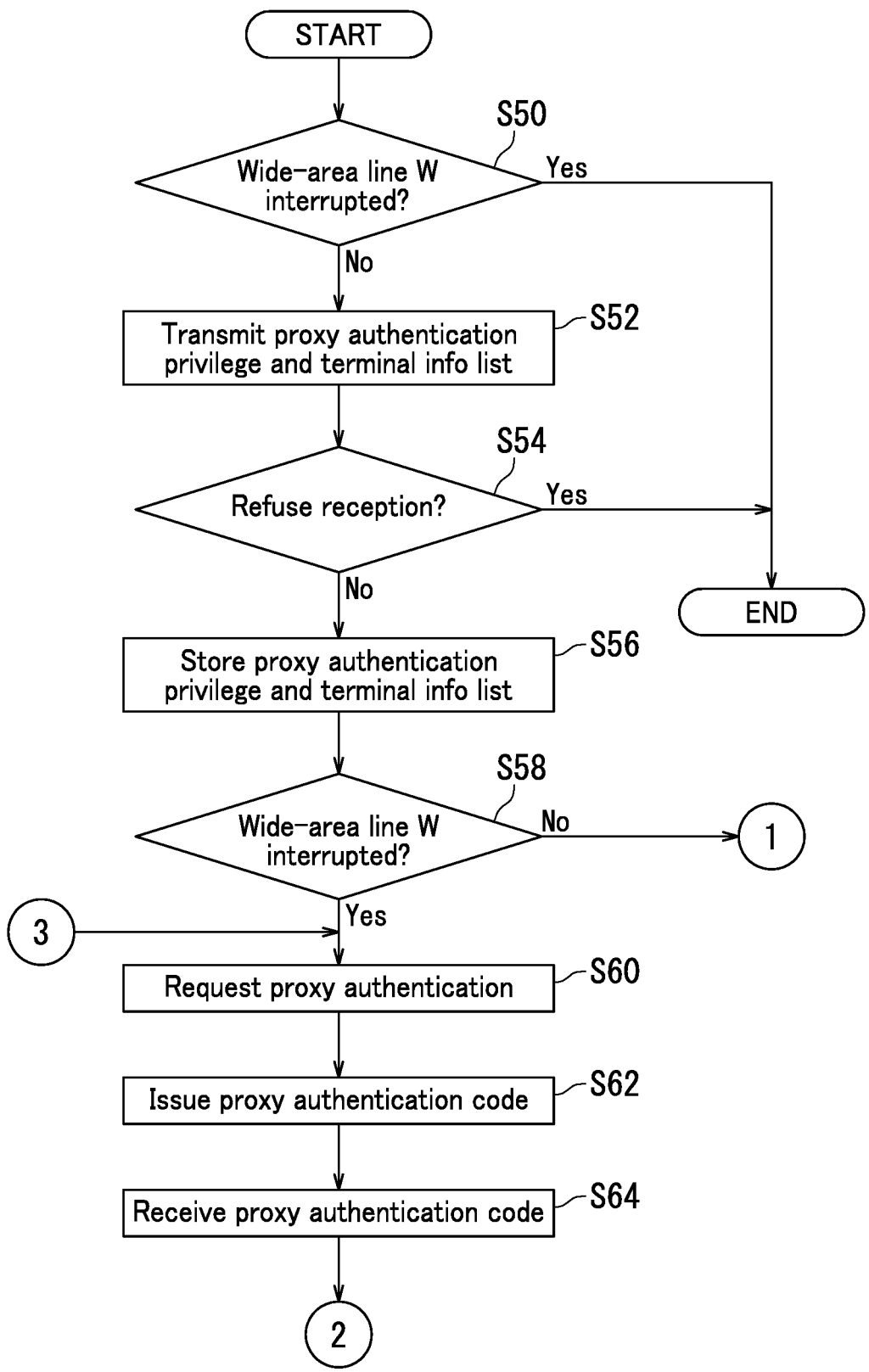
FIG. 8 is a flowchart depicting a portion of an information processing method in the embodiment.
Figure 9:
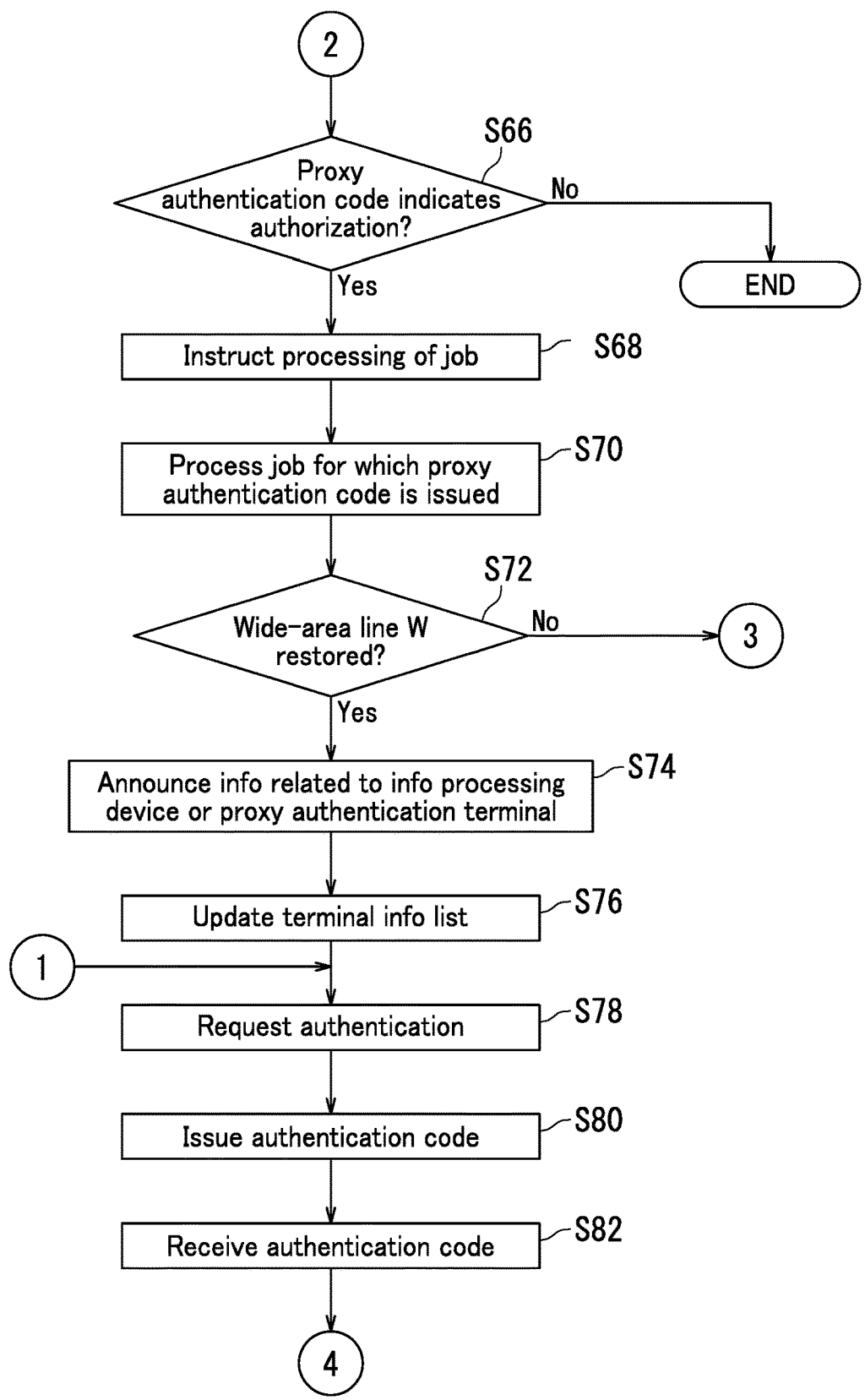
FIG. 9 is a flowchart depicting another portion of the information processing method in the embodiment.
Figure 10:
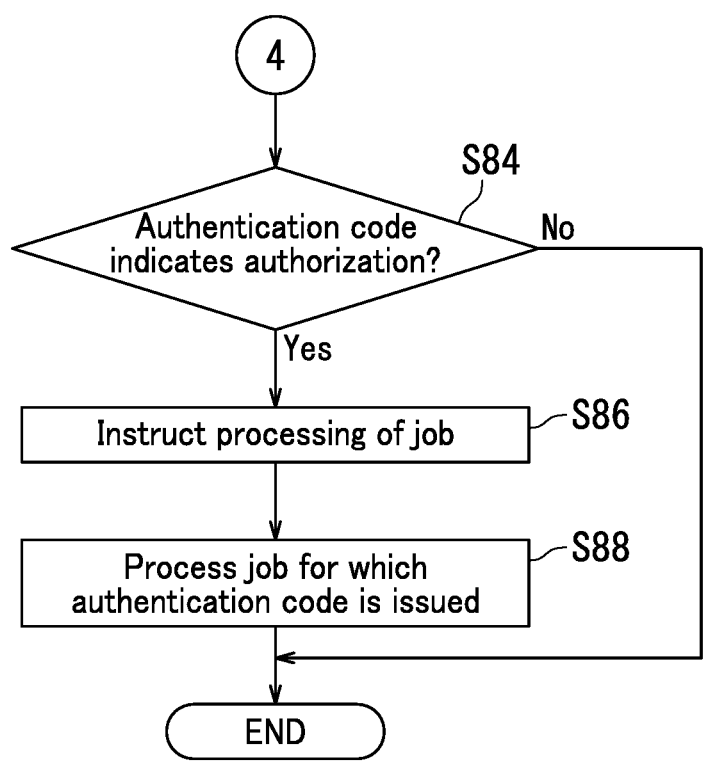
FIG. 10 is a flowchart depicting a remaining portion of the information processing method in the present embodiment.

Next, an information processing method according to the present embodiment is described with reference to FIGS. 8 to 10. FIGS. 8 to 10 are flowcharts depicting the information processing method in the present embodiment. As illustrated in FIGS. 8 to 10, the process includes Steps S50 to S88. Specifically, the process of the information processing method is as follows.

In Step S50 as depicted in FIG. 8, the confirming section 21 of the authentication server 2 determines whether or not a fault has occurred in the wide-area line W, causing the wide-area line W to be interrupted. When a fault has occurred in the wide-area line W (Yes in Step S50), the process ends. When a fault has not occurred in the wide-area line W (No in Step S50), the process advances to Step S52.

In Step S52, the transmission section 23 transmits a proxy authentication privilege and a terminal information list. The process advances to Step S54.

In Step S54, the setting section 44 of the proxy authentication terminal 4 determines whether or not to refuse to receive the proxy authentication privilege and the terminal information list. When reception is refused (Yes in Step S54), the process ends. When reception is not refused (No in Step S54), the process advances to Step S56.

In Step S56, the terminal storage 45 stores the proxy authentication privilege and the terminal information list. The process advances to Step S58.

In Step S58, the line confirming section 61 of the information processing device 6 determines whether or not the wide-area line W is interrupted. When the wide-area line W is interrupted (Yes in Step S58), the process advances to Step S60. When the wide-area line W is not interrupted (No in Step S58), the process advances to Step S78 depicted in FIG. 9.

In Step S60, the requesting section 62 requests proxy authentication. The process advances to Step S62.

In Step S62, the proxy authentication code issuing section 43 of the proxy authentication terminal 4 issues a proxy authentication code. The process advances to Step S64.

In Step S64, the receiving section 63 of the information processing device 6 receives the proxy authentication code. The process advances to Step S66 depicted in FIG. 9.

In Step S66 depicted in FIG. 9, the determining section 64 determines whether or not the proxy authentication code indicates authorization. When the proxy authentication code indicates authorization (Yes in Step S66), the process advances to Step S68. When the proxy authentication code indicates unauthorization (No in Step S66), the process ends.

In Step S68, the instructing section 65 instructs processing of a job. The process advances to Step S70.

In Step S70, the processing device 8 processes the job for which the proxy authentication code is issued. The process advances to Step S72.

In Step S72, the detector 47 of the proxy authentication terminal 4 determines whether or not the wide-area line W has been restored. When the wide-area line W has been restored (Yes in Step S72), the process advances to Step S74. When the wide-area line W has not been restored (No in Step S74), the process advances to Step S60 depicted in FIG. 8 and the requesting section 62 of the information processing device 6 again requests proxy authentication.

In Step S74, the announcing section 48 of the proxy authentication terminal 4 announces information related to the information processing device 6 or the proxy authentication terminal 4. The process advances to Step S76.

In Step S76, the server storage 22 of the authentication server 2 updates the terminal information list. The process advances to Step S78.

In Step S78, the requesting section 62 of the information processing device 6 performs an authentication request. The process advances to Step S80.

In Step S80, the authentication code issuing section 25 of the authentication server 2 issues an authentication code. The process advances to Step S82.

In Step S82, the receiving section 63 of the information processing device 6 receives the authentication code. The process advances to Step S84 depicted in FIG. 10.

In Step S84 depicted in FIG. 10, the determining section 64 determines whether or not the authentication code indicates authorization. When the authentication code indicates authorization (Yes in Step S84), the process advances to Step S86. When the authentication code indicates unauthorization (No in Step S84), the process ends.

In Step S86, the instructing section 65 instructs processing of a job. The process advances to Step S88.

In Step S88, the processing device 8 processes a job for which the authentication code is issued. The process then ends.

Embodiments of the present disclosure are described above with reference to the accompanying drawings. However, the present disclosure is not limited to the above embodiments and may be implemented in various manners within a scope not departing from the gist thereof. Furthermore, various disclosures may be created by appropriately combining elements of configuration disclosed in the above embodiments. For example, some elements of configuration may be removed from the entirety thereof illustrated in the embodiments. Additionally, elements of configuration may be appropriately combined across different embodiments. The drawings mainly illustrate elements of configuration schematically to facilitate understanding. Aspects such as number of the elements of configuration illustrated in the drawings differ in practice for the sake of convenience of drawing preparation. Furthermore, aspects such as shape of the elements of configuration illustrated in the above embodiments are one example and not particular limitations. The elements of configuration may be variously altered within a scope not substantially departing from the configuration of the present disclosure.

What is claimed is:

1. An information processing system comprising:
   an authentication server which is connected to a wide-area line located outside a prescribed area, has an authentication privilege, and is configured to issue an authentication code;
   a proxy authentication terminal which is connected to the authentication server through the wide-area line, has a proxy authentication privilege which serves as a proxy for the authentication privilege, and is configured to issue a proxy authentication code; and
   an information processing device which is connected to the proxy authentication terminal through a local-area line located within the prescribed area and is configured to receive the proxy authentication code from the proxy authentication terminal and instruct processing of a jobs wherein;
   the authentication server has a terminal information list to which the information processing device or the proxy authentication terminal is registered,
   the authentication server includes:
   server storage which stores the authentication privilege therein; and
   a transmission section configured to transmit the proxy authentication privilege to the information processing device or the proxy authentication terminal registered to the terminal information list,
   the transmission section assigns a validity limit to the transmitted proxy authentication privilege,
   the proxy authentication privilege which is assigned the validity limit expires when the validity limit elapses,
   the transmission section sets the validity limit to until a power of the proxy authentication terminal or the information processing device is turned off, and
   the transmission section assigns a proxy authentication privilege with a new validity limit to the proxy authentication terminal or the information processing device each time the power is turned off.

2. The information processing system according to claim 1, wherein
   the proxy authentication terminal includes:
   a receiving section which receives the proxy authentication privilege;
   a proxy authentication section which performs proxy authentication in response to a proxy authentication request from the information processing device; and
   a proxy authentication code issuing section which issues the proxy authentication code to the information processing device.

3. The information processing system according to claim 2, wherein
   the proxy authentication terminal further includes a setting section which sets the proxy authentication terminal to refuse to receive the proxy authentication privilege.

4. The information processing system according to claim 1, wherein
   the information processing device includes:
   a requesting section which performs a proxy authentication request for the proxy authentication terminal to issue the proxy authentication code; and
   a receiving section which receives the proxy authentication code.

5. The information processing system according to claim 1, further comprising
   a processing device connected to the information processing device through the local-area line and configured to process the job as instructed by the information processing device for which the proxy authentication code is issued, wherein
   the information processing device includes:
   a determining section which determines whether the authentication code or the proxy authentication code indicates authorization or unauthorization; and
   an instructing section which instructs the processing device to process the job when the authentication code or the proxy authentication code indicates authorization.

6. The information processing system according to claim 5, wherein
   a plurality of proxy authentication codes are issued as the proxy authentication code, and
   the determining section
   determines that the information processing device or the job is authorized when all of the received proxy authentication codes indicate authorization, or
   determines that the information processing device or the job is not authorized when one of the received proxy authentication codes indicates unauthorization, or
   determines that the information processing device or the job is authorized when most of the received proxy authentication codes indicate authorization.

7. The information processing system according to claim 1, wherein
   the proxy authentication terminal includes:

terminal storage which stores the proxy authentication privilege therein; and a managing section which assigns a validity limit to the proxy authentication privilege and invalidates the proxy authentication privilege when the validity limit elapses.

8. The information processing system according to claim 1, wherein the proxy authentication terminal includes:

a detector which detects that the wide-area line has been restored and which outputs line information; and an announcing section which announces information related to the proxy authentication terminal or the information processing device to the authentication server based on the line information, the information processing device includes a requesting section which performs an authentication request to the authentication server to issue the authentication code, and the authentication server includes:

an authentication section configured to perform authentication in response to the authentication request; and an authentication code issuing section which issues the authentication code to the information processing device.

9. The information processing system according to claim 1, wherein upon detection of restoration of the wide-area line through a state confirmation signal, the transmission section assigns the validity limit such that the proxy authentication privilege expires.

10. An information processing device for processing information, the information processing device being connected to an authentication server through a wide-area line located outside a prescribed area and being connected to a proxy authentication terminal and a processing device through a local-area line located within the prescribed area, the authentication server having an authentication privilege, the proxy authentication terminal having a proxy authentication privilege which serves as a proxy for the authentication privilege, the processing device processing a job for which a proxy authentication code is issued, the information processing device comprising:

a requesting section configured to request the proxy authentication terminal to perform proxy authentication so as to issue the proxy authentication code; and a receiving section configured to receive the proxy authentication code, wherein the authentication server has a terminal information list to which the information processing device or the proxy authentication terminal is registered, the authentication server includes:

server storage which stores the authentication privilege therein; and a transmission section configured to transmit the proxy authentication privilege to the information processing device or the proxy authentication terminal registered to the terminal information list, the transmission section assigns a validity limit to the transmitted proxy authentication privilege, the proxy authentication privilege which is assigned the validity limit expires when the validity limit elapses, the transmission section sets the validity limit to until a power of the proxy authentication terminal or the information processing device is turned off, and the transmission section assigns a proxy authentication privilege with a new validity limit to the proxy authentication terminal or the information processing device each time the power is turned off.

11. The information processing device according to claim 10, wherein upon detection of restoration of the wide-area line through a state confirmation signal, the transmission section assigns the validity limit such that the proxy authentication privilege expires.

12. An information processing method comprising:

issuing, by an authentication server which is connected to a wide-area line located outside a presided area, which has an authentication privilege, an authentication code, wherein the authentications server has a terminal information list to which a information processing device or a proxy authentication terminal is registered;

issuing, by the proxy authentication terminal which is connected to the authentication sever through the wide-area line, a proxy authentication code based on a proxy authentication privilege which serves as a proxy for an authentication privilege;

receiving, by the information processing device which is connected to the proxy authentication terminal though a local-area line located within the prescribed area, the proxy authentication code, from the proxy authentication terminal;

instructing, by the information processing device, processing of a job;

storing, by the authentication server, the authentication privilege;

transmitting, by the authentication server, the proxy authentication privilege to the information processing device or the proxy authentication terminal registered to the terminal information list;

assigning by the authentication server, a validity limit to the transmitted proxy authentication privilege, the proxy authentication privilege which is assigned the validity limit expiring when the validity limit elapses, setting, by the authentication server, the validity limit to until a power of the proxy authentication terminal or the information processing device is turned off, assigning, by the authentication server, a proxy authentication privilege with a new validity limit to the proxy authentication terminal or the information processing device each time the power is turned off; and processing the job for which the proxy authentication code is issued.

13. The information processing method according to claim 12, further comprising assigning, upon detection of restoration of the wide-area line through a state confirmation signal, the validity limit such that the proxy authentication privilege expires.

* * * * *